United States Patent
D'Mura

(10) Patent No.: US 7,149,595 B2
(45) Date of Patent: Dec. 12, 2006

(54) MATERIAL CLASSIFICATION SYSTEM AND METHODS

(75) Inventor: Paul R. D'Mura, Glendale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 417 days.

(21) Appl. No.: 10/640,544

(22) Filed: Aug. 13, 2003

(65) Prior Publication Data

US 2005/0038536 A1 Feb. 17, 2005

(51) Int. Cl.
*G06F 19/00* (2006.01)
(52) U.S. Cl. .................................. 700/96; 700/106
(58) Field of Classification Search ............... 700/96, 700/97, 83, 106; 707/102
See application file for complete search history.

(56) References Cited

U.S. PATENT DOCUMENTS

| | | | |
|---|---|---|---|
| 5,262,954 A | | 11/1993 | Fujino et al. |
| 5,555,179 A | | 9/1996 | Koyama et al. |
| 5,873,448 A | | 2/1999 | Tsai et al. |
| 6,629,003 B1 * | | 9/2003 | Frizzell et al. ............ 700/97 |
| 6,760,630 B1 | | 7/2004 | Turnaus et al. |
| 2003/0139936 A1 * | | 7/2003 | Saucier et al. ............ 705/1 |
| 2004/0034648 A1 * | | 2/2004 | Hsu et al. ............ 707/102 |
| 2004/0152311 A1 * | | 8/2004 | Ghyselen et al. ............ 438/689 |

OTHER PUBLICATIONS

Oscar Castillo, Raul Cardona and Patricia Melin, "A Hybrid Approach for Automated Quality Control Combining Learning Vector Quantization Neural Networks and Fuzzy Logic", 2002, 5 pages.

* cited by examiner

*Primary Examiner*—Zoila Cabrera
(74) *Attorney, Agent, or Firm*—Amin Turocy & Calvin LLP; William R. Walbrun

(57) ABSTRACT

The present invention relates to a system and methodology facilitating material class processing and quality controls in an industrial controller environment. One or more classes are provided that generically describe materials or components of a recipe. The classes are associated with the recipe and resolved or determined before or during runtime of automated processes producing the recipe. If a class designation is encountered during recipe execution, an operator can be queried for which material or materials from the detected class is desired for the recipe currently being produced. After a material is selected from the class, the recipe is then processed according to the selected material from the respective class. In another aspect, automatic selections can be made to resolve members of class-based recipes. In yet another aspect of the present invention, quality phase processes and procedures are associated with a recipe and can be automatically initiated during various phases or stages of recipe production. Such processes include quality tests, quality recording/documentation, corrective actions, maintenance procedures, serving embedded files or documentation, initiating training procedures, and/or providing other automated procedures.

25 Claims, 13 Drawing Sheets

MATERIAL CLASSIFICATION SYSTEM AND METHODS

TECHNICAL FIELD

The present invention relates generally to industrial control systems, and more particularly to a system and methodology to facilitate material class processing in an automated industrial controller environment.

BACKGROUND OF THE INVENTION

Industrial controllers are special-purpose computers utilized for controlling industrial processes, manufacturing equipment, and other factory automation, such as data collection or networked systems. In accordance with a control program, the industrial controller, having an associated processor (or processors), measures one or more process variables or inputs reflecting the status of a controlled system, and changes outputs effecting control of such system. The inputs and outputs may be binary, (e.g., on or off), as well as analog inputs and outputs assuming a continuous range of values.

Measured inputs received from such systems and the outputs transmitted by the systems generally pass through one or more input/output (I/O) modules. These I/O modules serve as an electrical interface to the controller and may be located proximate or remote from the controller including remote network interfaces to associated systems. Inputs and outputs may be recorded in an I/O table in processor memory, wherein input values may be asynchronously read from one or more input modules and output values written to the I/O table for subsequent communication to the control system by specialized communications circuitry (e.g., back plane interface, communications module). Output modules may interface directly with one or more control elements, by receiving an output from the I/O table to control a device such as a motor, valve, solenoid, amplifier, and the like.

At the core of the industrial control system, is a logic processor such as a Programmable Logic Controller (PLC) or PC-based controller. Programmable Logic Controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs. These variables can be user-defined and can be defined as bits, bytes, words, integers, floating point numbers, timers, counters and/or other data types to name but a few examples.

Industrial controllers are often employed in integrated manufacturing operations that can often involve high-complexity manufacturing processes. Such processes which are sometimes referred to as batch processes are involved in many areas of modern production. These areas include substantially any type of packaged products that are commonly found in grocery stores or other distribution outlets. For example, these products include beverages, candies, sugar, flour, pastries, boxed items such as cereals, frozen products, cheeses, and so forth. Often, complex factory equipment arrangements and programming are provided to produce all or portions of such products. Programming is often provided in terms of Sequential Function Blocks and Charts that relate logical/programmed production operations to equipment assets that control the operations.

One challenge facing automated processing systems is the requirement to produce various different types of products within the confines of a single manufacturing center or facility. For example, often times hundreds of different types of recipes are maintained for some product families that only vary slightly in terms of the actual ingredients in the recipe. Thus, for a product such as cherry vanilla ice cream and a product such as strawberry vanilla ice cream, two different recipes would be required to be maintained—although the only difference in recipe content is the type of fruit employed in the final production process. As can be appreciated, as product families grow in terms of quantity and diversity, maintenance of such recipes', respective programs, and equipment to produce such products becomes ever more complicated in terms of product/factory management but also in terms of maintaining quality within and across product lines.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to facilitate material class processing and providing automated quality controls in an industrial automation environment. In one aspect of the present invention, one or more class structures are defined that generically describe a grouping of components that can be applied to one or more recipes. Such components typically include materials that are listed or stored as members of a class. At run time of an automated industrial control process, a recipe is retrieved from a database, wherein the recipe contains the class structures, other materials, and associated logic for processing the recipe or batch. Before or during execution of the recipe or batch, class designations contained within the recipe are resolved for actual materials desired for employment with the recipe at hand.

In one example, a generic candy bar recipe may be designed that produces chocolate peanut candy bars and chocolate almond candy bars, whereby the generic or base recipe calls for the class ingredient "nuts." Before or during execution of the candy bar recipe, an operator is queried (and/or automatic procedures initiated) for the type of nuts desired—peanuts or almonds in this example. If for example, almonds are selected (manually and/or automatically), an automated industrial control process is initiated to produce chocolate almond candy bars in accordance with the underlying ingredients for the generic chocolate candy bar and the selected or resolved material (almonds, peanuts) from the class (nuts). By introducing the concept of class structure in accordance with the recipe, the number of recipes to be maintained can be reduced by resolving the actual materials for production at or near run time of the recipe. Since fewer recipes are required, system and process quality can be enhanced by reducing complexity of operating, auditing, and maintaining a plurality of recipes that may only vary in some cases to a minor degree.

In another aspect of the present invention, automated quality phase processing is provided to facilitate quality controls in an industrial controller environment. Quality processes are associated with one or more components of a recipe and/or process associated with the recipe such as a Sequential Function Chart logic program. Before or during execution of the recipe, the quality processes or procedures are automatically initiated from various stages of the recipe in order to facilitate quality control in the overall process of recipe production. Such quality processes can include automatically initiating quality tests from different stages in a recipe, initiating quality recording and documentation procedures during recipe execution, automatically performing corrective actions and performing maintenance procedures during recipe execution, invoking embedded files within a recipe that can be utilized by other components or reviewed by an operator, providing Just-In-Time training to an operator during various stages of a recipe, and/or spawning other automatic procedures during various stages of recipe production. By associating quality procedures to a recipe or stages thereof, timely, tighter and more stringent controls can be applied to various automation processes and thus increase overall quality in an automated manufacturing environment.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology facilitating material class processing and quality controls in an industrial controller environment. One or more classes are provided that generically describe materials or components of a recipe. The classes are associated with the recipe (or incorporated therein) and resolved or determined before or during runtime of automated processes producing the recipe. If a class designation is encountered during recipe execution, an operator can be queried for which material or materials from the detected class is desired for the recipe currently being produced. After a material is selected from the class, the recipe is then processed according to the selected material from the respective class. In another aspect, automatic selections can be made to resolve members of class-based recipes. In yet another aspect of the present invention, quality phase processes and procedures are associated with a recipe and can be automatically initiated during various phases or stages of recipe production. Such processes include quality tests, quality recording/documentation, corrective actions, maintenance procedures, serving embedded files or documentation, initiating training procedures, and/or providing other automated procedures.

It is noted that as used in this application, terms such as "component," "class," "resolver," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
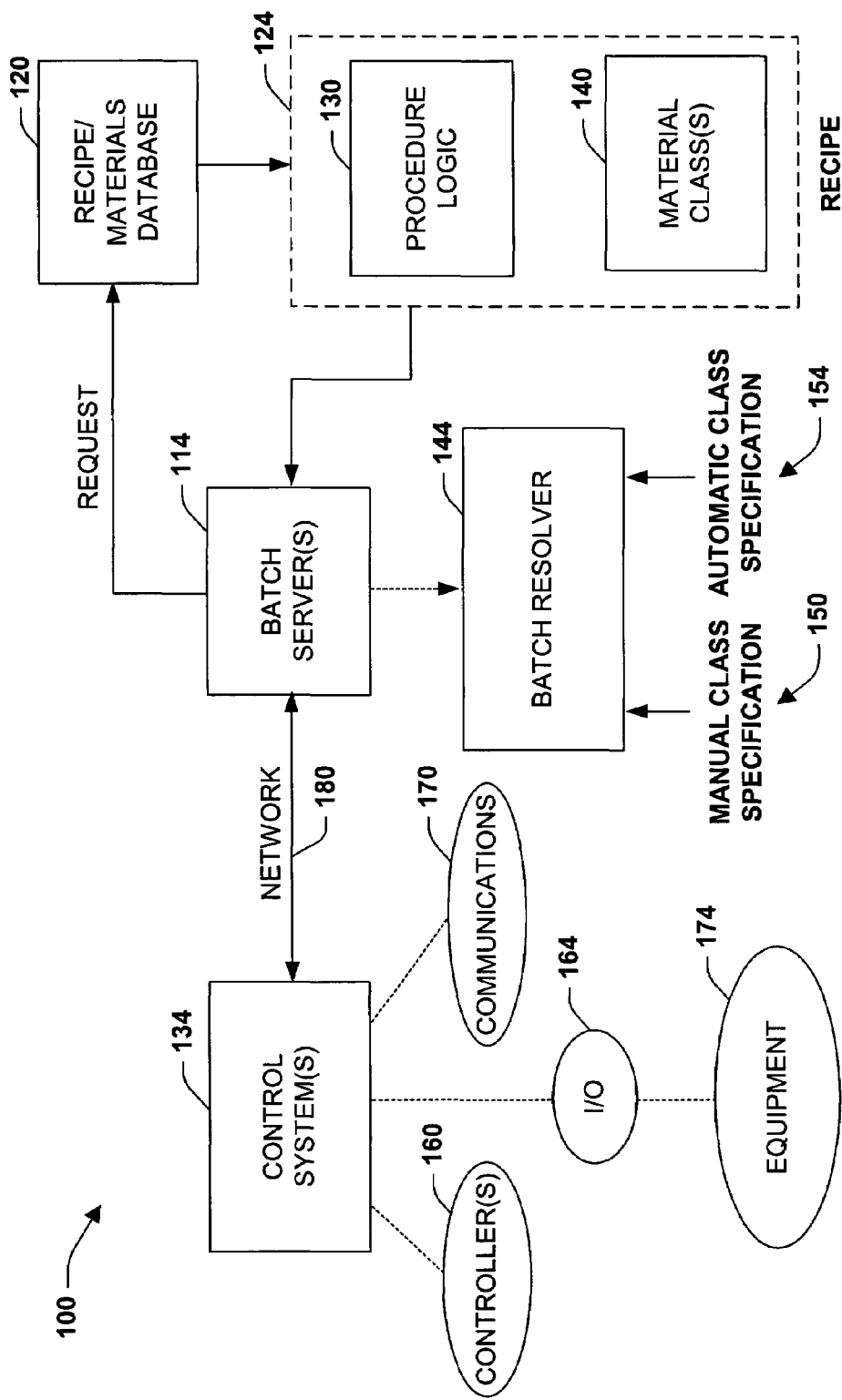
FIG. 1 is a schematic block diagram illustrates a material class processing system in accordance with an aspect of the present invention.

Referring initially to FIG. 1, a material class processing system 100 is illustrated in accordance with an aspect of the present invention. One or more batch servers 114 interact with a recipe/materials database 120 in order to retrieve and produce a recipe 124. The recipe 124 typically includes components such as procedure logic 130 that is transmitted to an automated control system 134 (or systems) that processes and manufacturers the recipe 124. In one aspect of the present invention, one or more material classes 140 are provided that describe materials or other components of the recipe 124. The material classes 140 provide a programming structure, wherein components of the class can be grouped under a common description or tag associated with the class. As can be appreciated, the recipe 124 may include other components than process logic and material classes 140 (e.g., state instructions, tags, objects, scheduling information, quality information, other materials and so forth).

In one example of the present invention, several carbonated beverages may be produced by the control system 134, whereby the beverages generally conform to the recipe 124, yet differ in flavor or other characteristics. In this example, the material class 140 "flavor" may be defined to include "cola, grape, orange, cherry and so forth." When the batch server 114 retrieves the recipe 124 and encounters a material class 140, a batch resolver 144 is provided to determine which ingredients or materials of the class 140 are to be employed for the present production cycle. In this example, if "grape" beverage were to be produced, then the batch resolver 144 would determine which of the material class components (e.g., grape selected from class flavor) were to be utilized for the respective batch at hand.

In one aspect, material class resolution can occur before and/or during runtime of the control system 134. Thus, the batch resolver 144 may include components such as a user interface (not shown) that are invoked by the batch server 114 (or control system/other component) in order to receive manual specifications of class components or materials at 150. In another aspect, automatic class specifications may occur at 154, whereby the batch resolver 144 is given material instructions from an automated system operating via a network, for example (e.g., batch resolver queries automated scheduling system for material information when a class is encountered in recipe). It is noted that the functional components illustrated in the system 100 are exemplary in nature and not intended to define the only locations for material class processing in accordance with the present invention. For example, the batch server 114 may include computers or client machines and may not be present in the system 100 whereby the control system 134 performs the duties of the batch server 114. Similarly, the recipe/materials database 120 and batch resolver 144 may be associated with or incorporated within the batch server 114. In another example, the recipe/materials database 120 may exist as a network node on the Internet and thus, interacts with the control system 134 with or without assistance from the batch server 114. As can be appreciated, other functional combinations are possible with the components illustrated in the system 100 (e.g., batch resolver associated with or included in control system).

When material class components have been resolved, the control system 134 processes the recipe 124 in accordance with the procedure logic 130 and materials selected from the material classes 140. The control system 134 can include various systems for processing the recipe 124. Such systems include one or more controllers 160, one or more I/O modules 164 (e.g., analog modules, digital modules, discrete AC and DC modules, Intelligent modules and so forth), communications modules 170 and various equipment 174 to produce the recipe 124. The communications modules 170 facilitate control system communications across a network 180 such as ControlNet, Device, Net, Ethernet, Internet, other factory/public networks and so forth. The equipment 174 includes substantially any component for processing materials such as machines, computers, vessels, mixers, loaders, agitators, valves, conduits, plumbing, and so forth in order to manufacture the recipe and associated materials.

It is noted that the network 180 includes access to public networks such as the Internet, Intranets, and automation networks such as Control and Information Protocol (CIP) networks including DeviceNet and ControlNet (can be adapted as multiple networks wherein factory networks are isolated from public networks). Other networks 180 include Ethernet, TCP/IP, DH/DH+, Remote I/O, Fieldbus, Modbus, Profibus, wireless networks, serial protocols, and so forth. In addition, the control systems 134 can include network components such as switches with virtual local area network (VLAN) capability, LANs, WANs, proxies, gateways, routers, firewalls, virtual private network (VPN) devices, other servers and/or clients, configuration tools, monitoring tools, and/or other devices.

Figure 2:
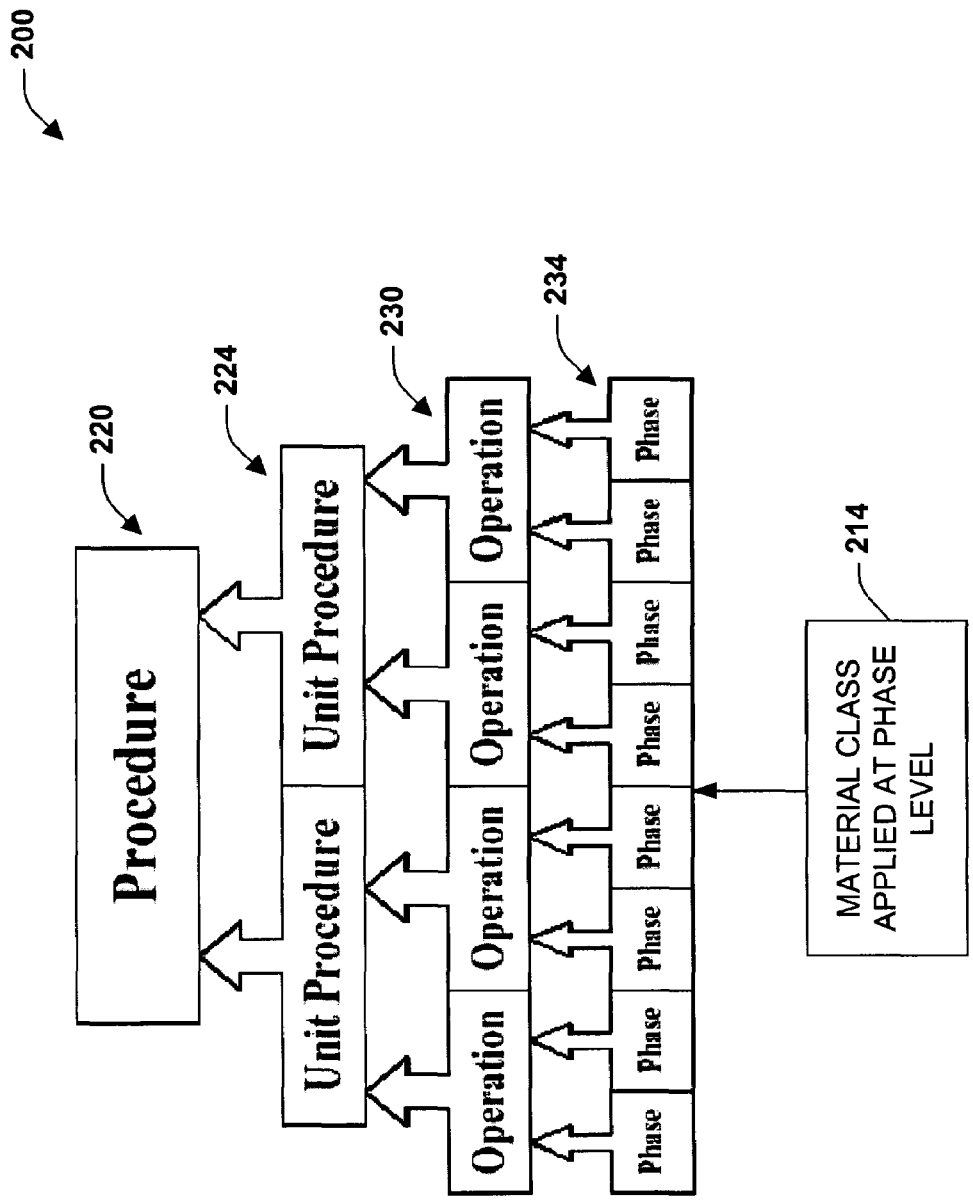
FIG. 2 is a diagram illustrating various stages of a material class processing system in accordance with an aspect of the present invention.

Referring now to FIG. 2, a diagram 200 illustrates various stages of a material class processing system in accordance with an aspect of the present invention. Various component stages are provided for processing one or more material classes 214. This can include utilization of a Batch Recipe Editor (not shown) to create and configure master recipes for use in batch automation. The interface can be based on IEC 61131-3 sequential function charts (SFC) to graphically organize recipes into procedures 220, unit procedures 224, operations 230 and phases 234, wherein the material classes are typically applied or resolved at the phase level 234. It is noted that the material classes 214 can be defined and/or resolved during substantially any portion of an industrial automation process. Furthermore, recipes can be built according to substantially any format such as SFC format, ladder logic, or a table-based format, for example. Recipes can be configured and displayed using ISA S88.01 Batch Control Standards or other standards, which define the following levels for a procedural model:

Procedure 220: A strategy for carrying out a process. In general, it refers to the strategy for making a batch within a process cell. It may refer to a process that does not result in the production of a product. Examples: Make Product A Make Product B.

Unit Procedure 224: A strategy for carrying out a contiguous process within a unit. It consists of contiguous operations and an algorithm for initiation, organization and control of those operations. Examples: Emulsification Dehydrogenation.

Operation 230: A procedural element defining an independent processing activity consisting of an algorithm for initiation, organization and control of phases 234. Examples: Filtration Reaction.

Phase 234: The lowest level of a procedural element in a procedural control model. A phase consists of the control steps and algorithm for initiation, organization and control of steps. Examples: Agitate Heat.

The recipe phase 234 is generally the lowest level within a recipe. The recipe phase is mapped to the engineered logic on a plant floor. When a phase is added to a recipe, it can be based on a phase that has been defined in an area model. Based on the equipment requirements specified in a recipe, a Batch Equipment Editor phase maps to a specific equipment module (an instance of a phase). The equipment module is mapped (using tags) to an equipment operation or equipment phase that has been defined in the engineered logic.

An operation consists of one or more recipe phases, and it generally runs within a single unit in an area model. Users can combine multiple operations into a single unit procedure, as long as respective operations run in a unit in an area model. Unit procedures are then combined to create a procedure, the highest recipe level. Procedures can run or execute across multiple units, allowing for unit-to-unit transfers.

Figure 3:
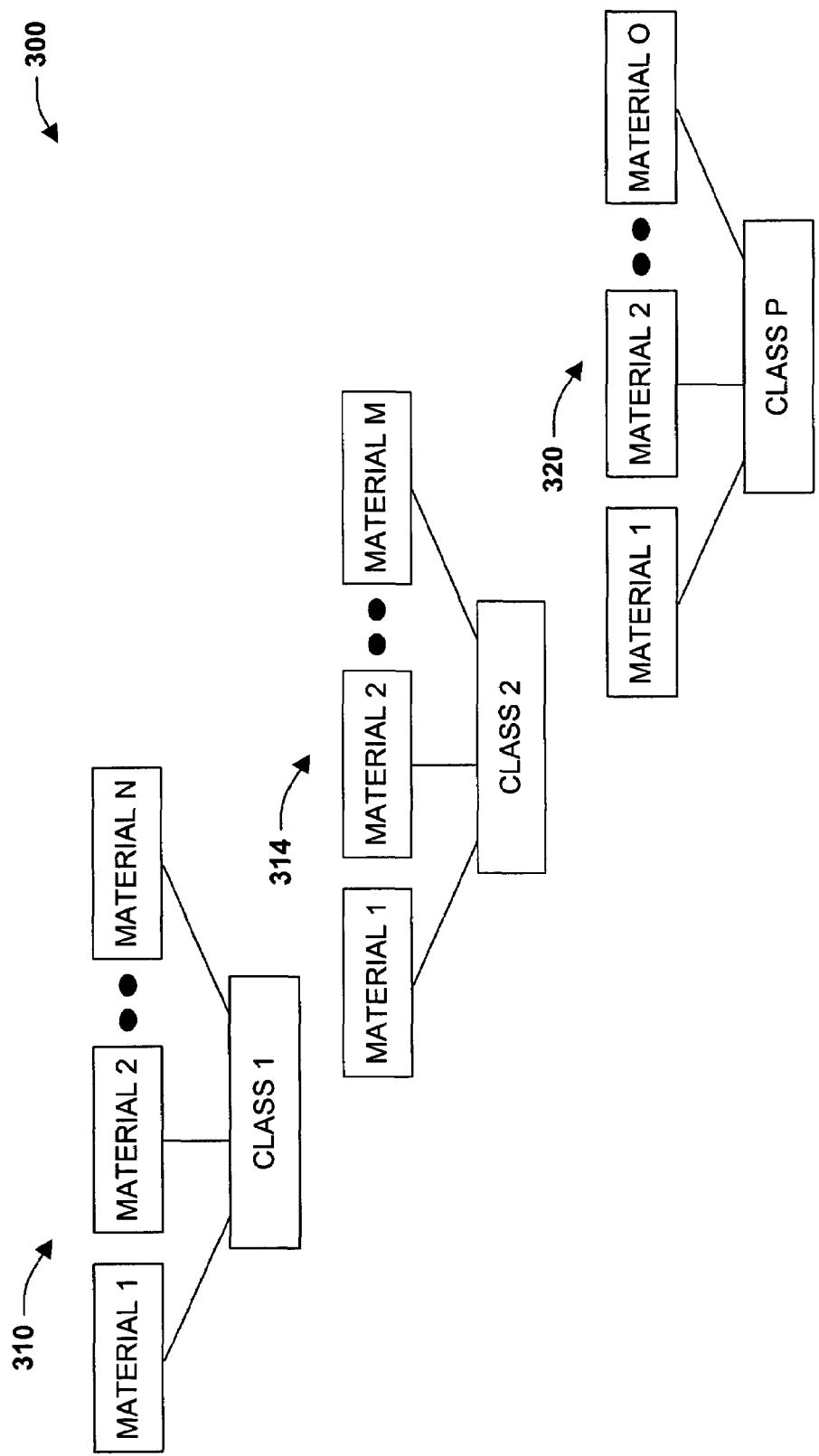
FIG. 3 is a diagram illustrating material class structures in accordance with an aspect of the present invention.

Turning to FIG. 3, a diagram 300 illustrates material class structures in accordance with an aspect of the present invention. One or more material class structures are illustrated at 310–320 and are designated as $Class_1$ through P, respectively, wherein P is an integer. As illustrated, respective classes 310–320 can be associated with one or more materials that identify components of a recipe. For example, $Class_1$ at 310 may identify or define materials 1 through N, $Class_2$ at 314 defines materials 1 though M, and $Class_P$ at 320 defines materials 1 through O, respectively, wherein N, M, and O are integers. As discussed above, the Classes 310–314 may include material definitions or descriptions that fall under the name or tag associated with the class. For example, $Class_1$ at 310 may be labeled or tagged with the name "Juice," wherein respective materials may be defined as orange, grape, grapefruit, and so forth.

It is to be appreciated that the concept of class can be applied to substantially any component or process relating to a recipe and is thus not limited to respective materials. For example, an equipment class could be defined having the name "Vessels," wherein respective class components could be defined as a box, a tube, a cylinder, and so forth. Thus, in this example, when a vessel is called for in a recipe process, the actual vessel to employ can be resolved in a similar manner to material class resolution described above. In another example, process classes may be employed. If a process class were defined as "Transfer," then respective process components linked to the process class may include fill, empty, scrap, exchange, and so forth.

Figure 4:
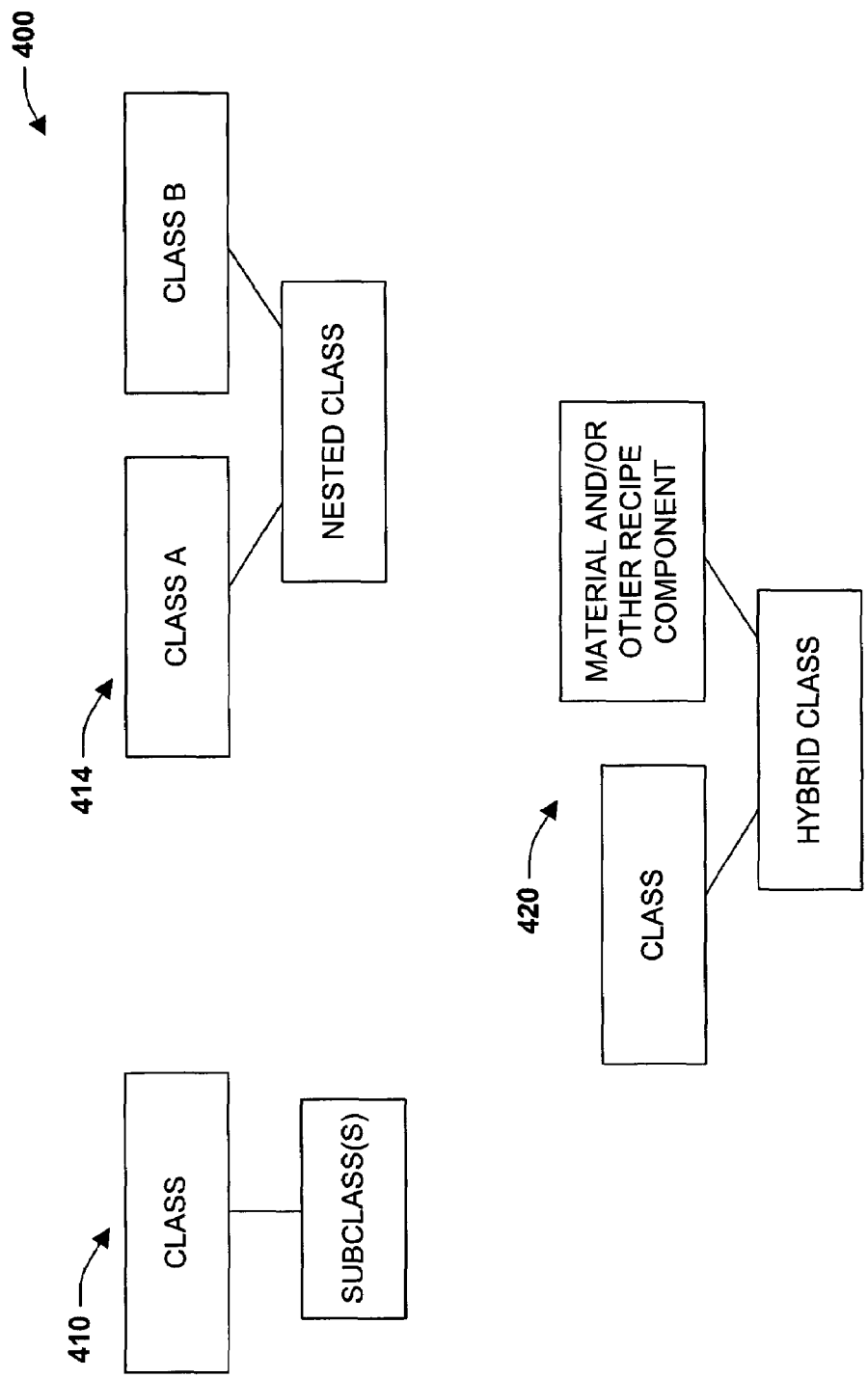
FIG. 4 is a diagram illustrating alternative class structures in accordance with an aspect of the present invention.

Referring to FIG. 4, a diagram 400 illustrates alternative class structures in accordance with an aspect of the present invention. The classes described above with respect to FIG. 3, generally describe a structure wherein a class defines similar materials or other components of a recipe. In this aspect of the present invention, the class structure may define or incorporate other structures or components of a respective class that are then resolved to various components of a recipe. For example, at 410 a class may be defined having one or more subclasses. In one example, a class "Beer" may describe subclasses such as "dark beer," "light beer," "amber beer," and so forth wherein respective subclasses are then resolved for an associated material or other component (e.g., dark beer subclass is resolved from the class beer and then further resolved for the process, equipment, or ingredient to produce dark beer).

At 414, the concept of a nested class may be employed. In this example, a nested class incorporates two or more classes (e.g., Class A and Class B defined for a particular nested class). In yet another example of the present invention, hybrid classes may be employed at 420. Hybrid classes my be defined to include a class structure having one or more of the components of the hybrid class belonging to a class along with a material and/or other component that are not defined as members of a class. For example, the hybrid class at 420 may include one or more classes and one or more materials that are not associated with a respective class. When a hybrid class is encountered, the respective classes and materials defined within the hybrid class structure can be resolved for the specific materials or components of the recipe from a list depicting the class components along with other members of the hybrid class that do not belong to the other classes. It is to be appreciated that the class structures depicted in FIG. 4 are exemplary in nature. Thus, although not shown, various combinations of class structures can be extrapolated therefrom. For example, a hybrid class may include classes, subclasses, nested classes, and/or materials or other components not associated with a respective class, subclass, or nested class.

Figure 5:
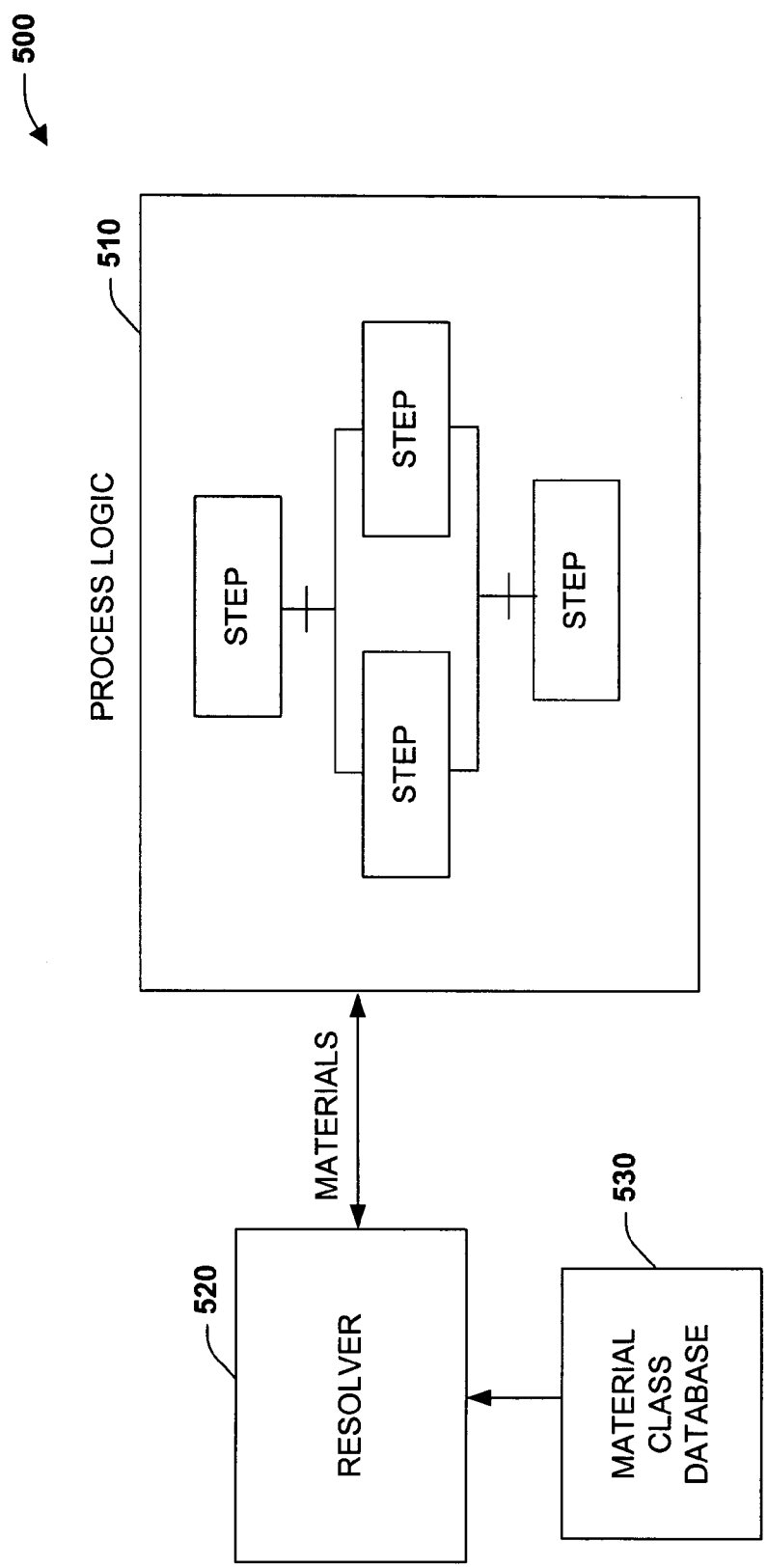
FIG. 5 is a diagram illustrating a material class processing in accordance with an aspect of the present invention.

Referring now to FIG. 5, a system 500 illustrates material class processing in accordance with an aspect of the present invention. Material classes may be resolved in various situations and processes. In one aspect, at run time of a logic program such as a Sequential Function Chart (SFC) 510, a material class may be encountered before or during execution of the SFC 510, wherein during a step or other sequence within the SFC a reference is made to a material class. If such a class is encountered, the SFC (or logic associated therewith) can contact a batch resolver 520 to identify respective materials or components associated with the encountered class. As will be described in more detail below, the batch resolver 520 may invoke a user interface (or automated program) that queries an operator to select a component from the encountered class. In this example, the batch resolver 520 can access a material class database 530, lookup the class, and present a material or component list of selections to the operator. In another example, the SFC 510 may be analyzed prior to loading or execution on a controller (not shown). If any material classes are discovered in the SFC 510, the material classes are resolved by the batch resolver 520, wherein selected materials or components are then populated within the SFC and downloaded to the controller for execution. Thus, material classes can be embedded within the SFC 510 and resolved when encountered in the SFC and/or can be resolved prior to execution of the SFC, wherein material class components are resolved, and then associated with the SFC before downloading to a respective controller.

Figure 6:
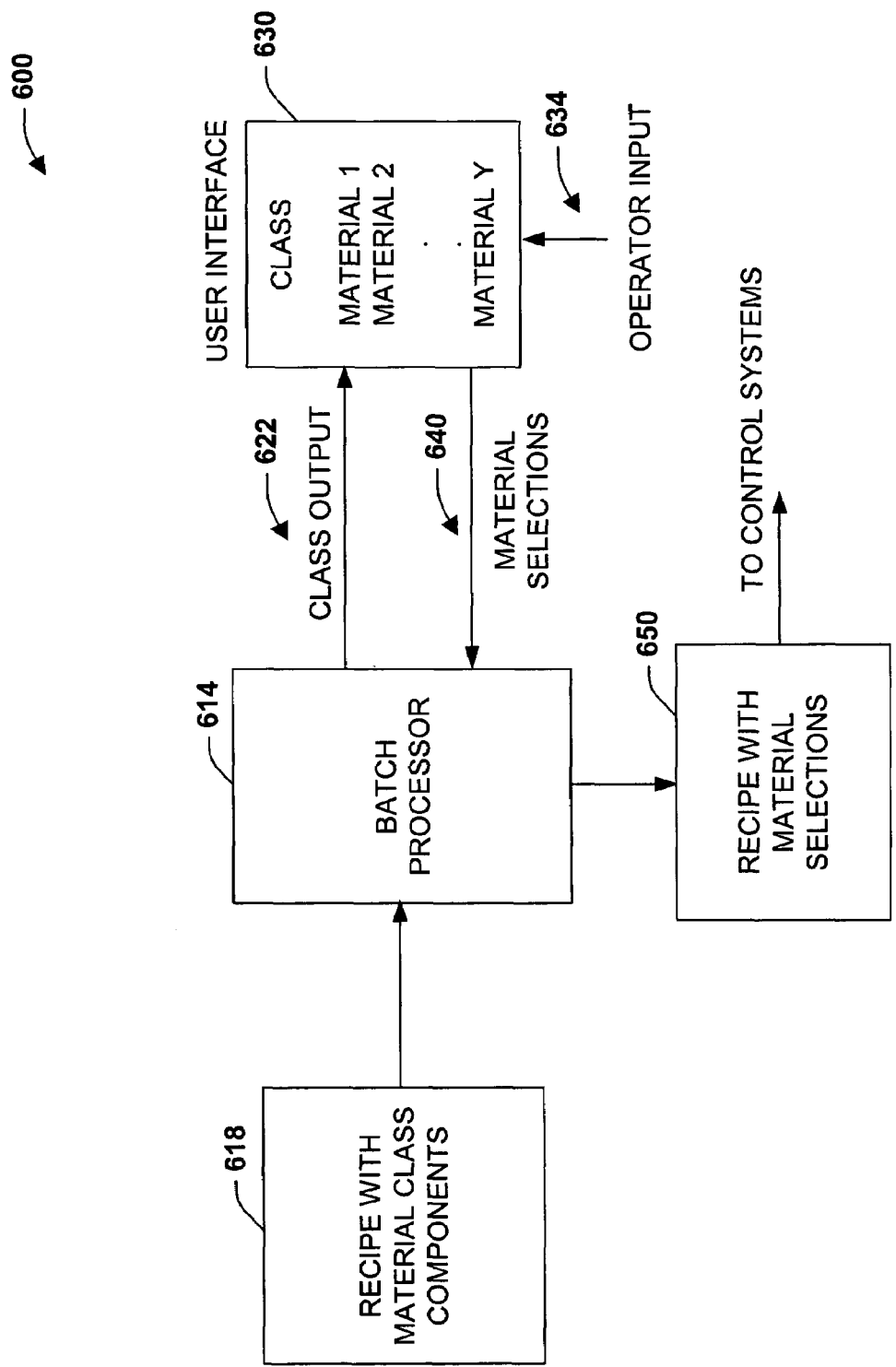
FIG. 6 is a diagram illustrating manual material selection from a class in accordance with an aspect of the present invention.

Referring to FIG. 6, a system 600 illustrates manual material selection from a class in accordance with an aspect of the present invention. A batch processor 614 receives a recipe 618 having one or more material class components. Upon detection of a class within the recipe 618, the batch processor 614 transmits a class output 622 to a user interface 630, whereby the components of the detected class are displayed. In this example, Materials 1–Y are displayed at the user interface 630, wherein Y is an integer, and the materials are derived from the detected class. Depending upon the current (or future) recipe the operator desires to run, one or more of the materials are selected at the user interface 630 via one or more operator inputs 634 (e.g. mouse, keypad, voice) and provided to the batch processor 614 as material selections 640. After receiving the material selections 640, the batch processor 614 configures a recipe having the desired material selections at 650. The recipe 650 with material selections is then loaded on a control system in order to manufacture the desired recipe.

The user interface 630 is provided to serve various applications to process classes in accordance with the present invention. For example, the user interface 630 can include a material editor for manipulating the material classes and an equipment editor for specifying equipment and/or a recipe editor for manipulating the recipe 618 (or recipes). For example, a material editor provides a user interface 630 to facilitate creating a material database, which includes materials, classes, lots, sublots, containers, and/or storage location data.

The user interface 630 includes various data manipulation and output capabilities. To implement material-based recipes, several types of data are typically configured such as:

Material Data

To add materials, lots, sublots, and the containers that hold them. This data is typically stored in a material database;

Equipment Data

An equipment editor can be employed to create material-enabled phases and then associate the resultant equipment module with a container;

Recipe Data

A recipe editor can be utilized to define the materials and amounts to employ in a recipe 618.

As can be appreciated, the user interface 630 can include various display and input capabilities. Thus, the user interface can be provided as a Graphical User Interface (GUI) or interface application to interact with the system 600. This can include substantially any type of application that sends, retrieves, processes, and/or manipulates the various models, data, and processes described herein. For example, such user interfaces 630 can also be associated with an engine or web browser although other type applications can be utilized. The user interface 630 includes a display having one or more display objects (not shown) including such aspects as configurable icons, buttons, sliders, input boxes, selection options, menus, tabs and so forth having multiple configurable dimensions, shapes, colors, text, data and sounds to facilitate operations with the systems and processes described herein. In addition, the user interface 630 can also include a plurality of other inputs 634 or controls for adjusting and configuring one or more aspects of the present invention. This can include receiving user commands from a mouse, keyboard, speech input, web site, remote web service and/or other device such as a camera or video input to affect or modify operations of the user interface 630.

Figure 7:
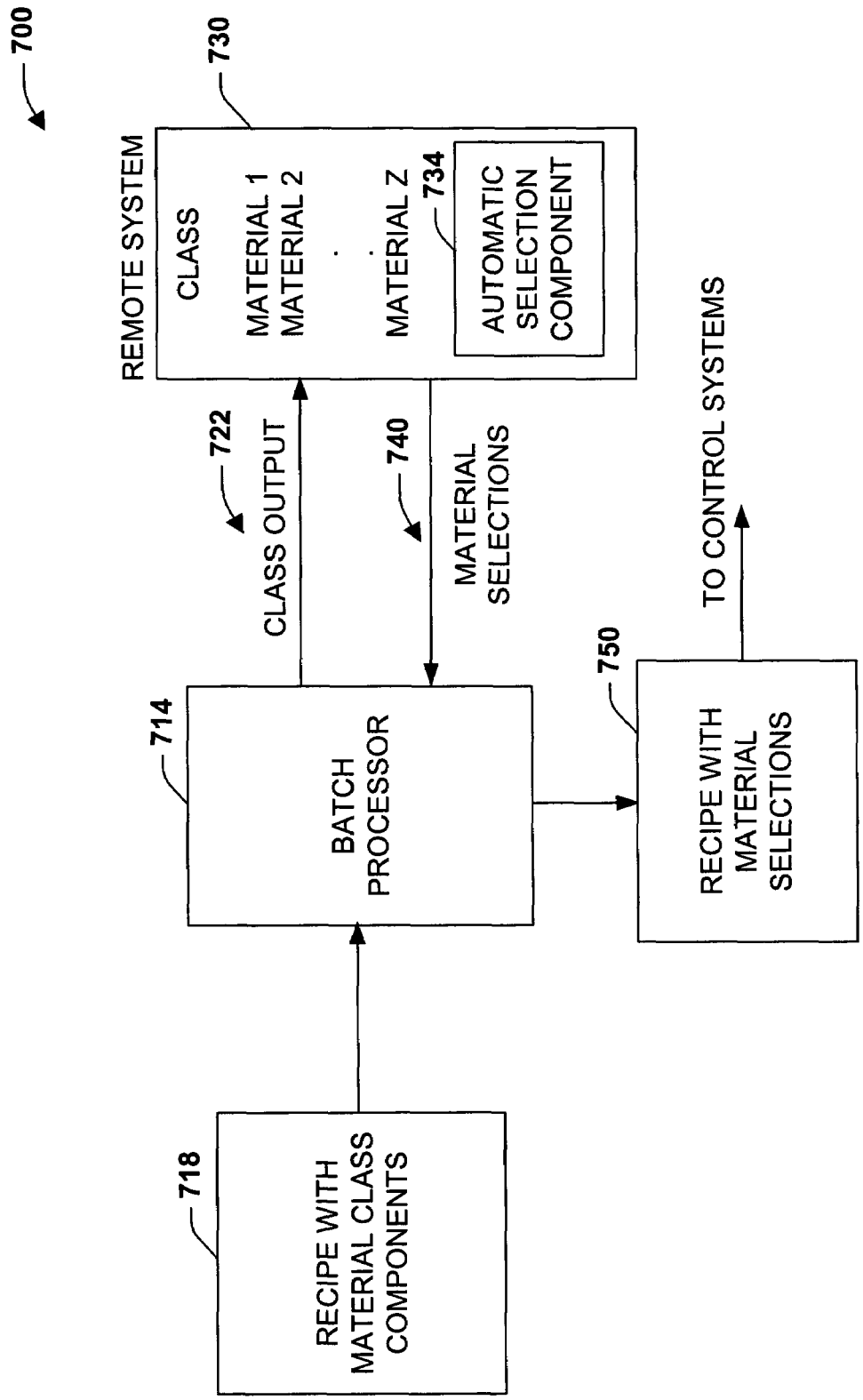
FIG. 7 is a diagram illustrating automatic material selection from a class in accordance with an aspect of the present invention.

FIG. 7 is a system 700 illustrating automatic material selection from a class in accordance with an aspect of the present invention. Similar to the system 600 described above, a batch processor 714 receives a recipe 718 having one or more material class components. Upon detection of a class within the recipe 718, the batch processor 714 transmits a class output 722 to a remote system 730, whereby the components of the detected class are analyzed and automatically resolved. In this example, Materials 1–Z are detected at the remote system 730, wherein Z is an integer, and the materials are automatically derived from the detected class. An automatic selection component 734 is provided to analyze the class output 722 and automatically return material selections 740 to the batch processor 714. After receiving the material selections 740, the batch processor 714 configures a recipe having the desired material selections at 750. The recipe 750 with material selections is then loaded on a control system in order to manufacture the desired recipe.

In this example, material classes may be analyzed on the remote system as part of an automated tracking and materials management system. For example, a master database may be maintained by the remote system 730 that includes various material classes and respective class components. Upon receiving class output 722, the automatic selection component 734 looks up the class to determine the associated materials for the class. Upon determining the materials, the automatic selection component 734 returns the associated material components to the batch processor in order to manufacture material class recipes.

Figure 8:
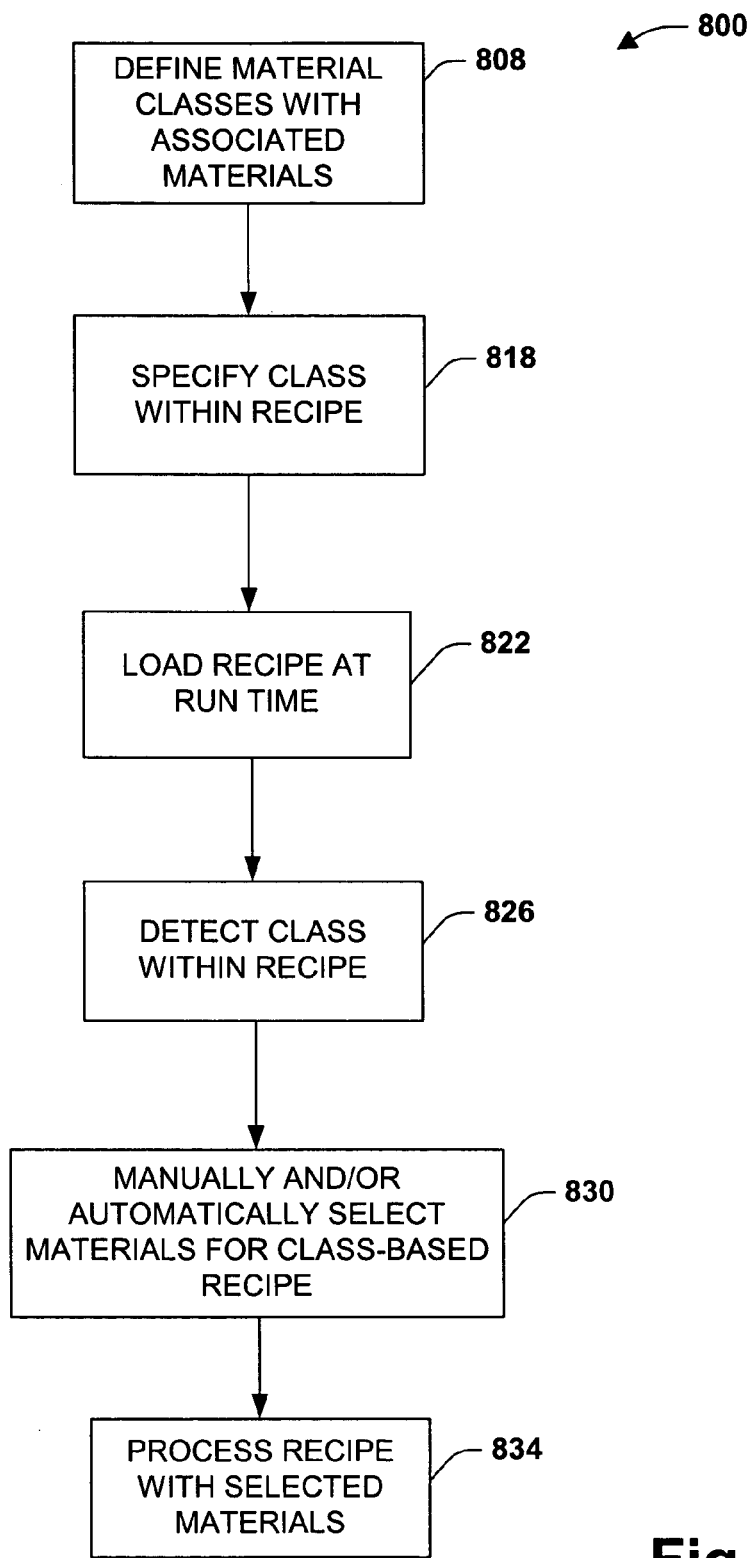
FIG. 8 is a flow diagram illustrating material class processing in accordance with an aspect of the present invention.
Figure 13:
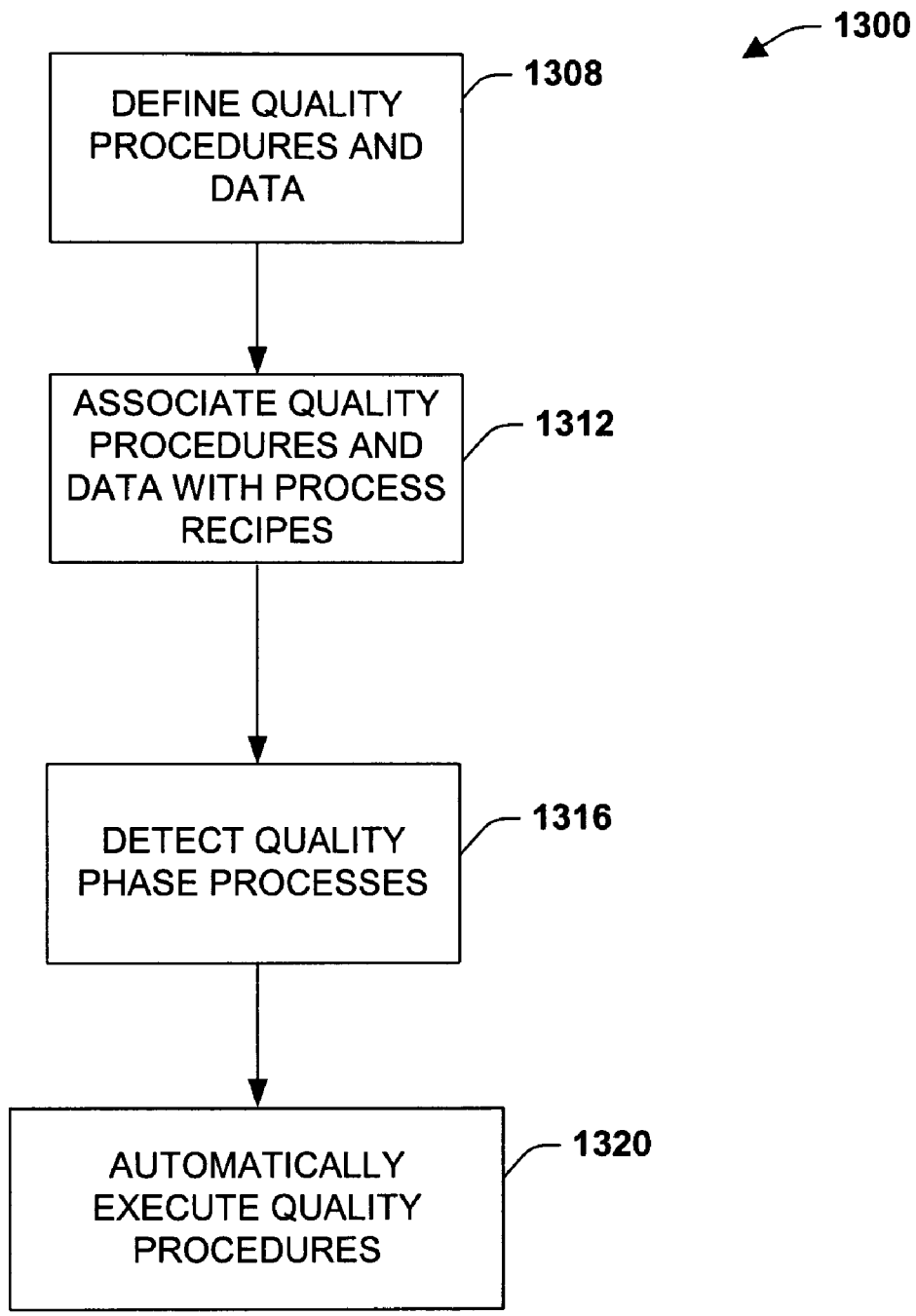
FIG. 13 is a flow diagram illustrating a quality phase process in accordance with an aspect of the present invention.

FIGS. 8 and 13 illustrate a material class and quality phase methodologies in accordance with an aspect the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 8 is a flow diagram 800 illustrating material class processing in accordance with an aspect of the present invention. Proceeding to 808, one or more material classes are defined having associated materials defined for the respective classes. As noted above, such classes can include subclasses, nested classes and/or hybrid classes. At 818, one or more classes are specified within or in accordance with a recipe. At 822, a recipe is loaded at runtime of the recipe. Such loading can occur by a batch processor that acquires the recipe from a materials database, for example. At 826, if a class based recipe is loaded at 822, then before or during execution of the recipe, classes are detected within the recipe. At 830, detected classes are resolved for the respective materials that are defined for the detected classes. This can include manual procedures whereby an operator is queried for the materials to be employed, and/or include automated procedures such as requesting material selections from a networked system or site such as from a web service, for example. At 834, the recipe having been resolved for constituent materials selected for the respective classes is manufactured such as via an automated control system.

Figure 9:
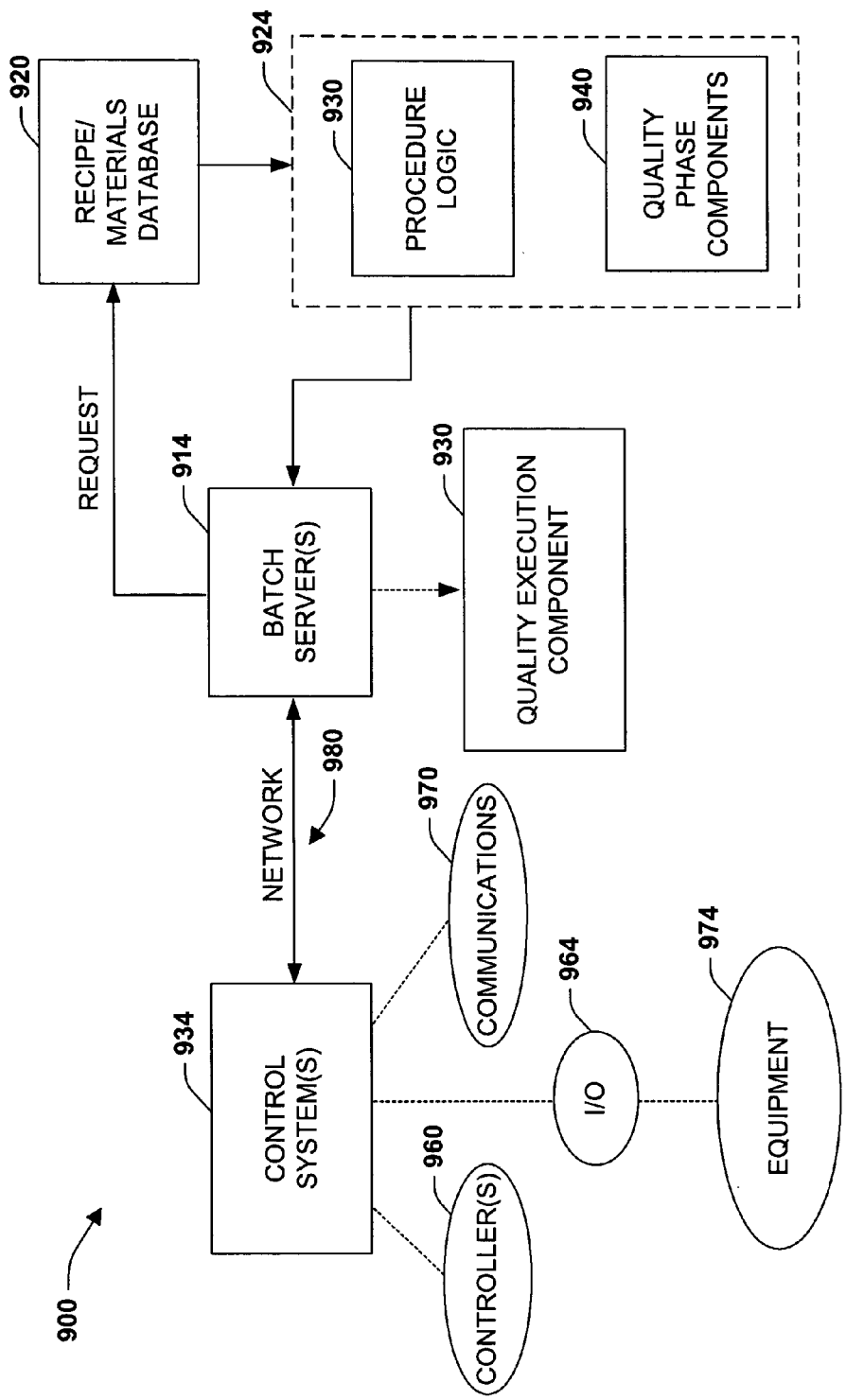
FIG. 9 is a schematic block diagram illustrating quality phase processing in accordance with an aspect of the present invention.

FIG. 9 is a schematic block diagram illustrating quality phase processing in accordance with an aspect of the present invention. Similar to material class processing above wherein material classes are associated with a recipe, quality control and execution operations/data can also be associated with automated recipe processing. One or more batch servers 914 interact with a recipe/materials database 920 in order to retrieve and produce a recipe 924. Similar to the system depicted in FIG. 1, the recipe 924 typically includes components such as process logic 130 that is transmitted to an automated control system 134 (or systems) that processes and manufacturers the recipe 924. In one aspect of the present invention, one or more quality phase components 940 are provided that invoke automated quality process in accordance with the recipe 924. The quality phase components 940 provide various quality controls such as quality tests, documentation, corrective actions, maintenance procedures, and training procedures which are described in more detail below with respect to FIG. 10. As noted above, the recipe 924 may include other components than procedure logic 930 and quality phase components 940 (e.g., state instructions, tags, classes, materials, objects, scheduling information, quality information, other materials and so forth).

In one aspect, the quality phase components 940 can be executed before and/or during runtime of the control system 934. A quality execution component 944 may include components for executing the quality phase components 940 such as a user interface (not shown) and/or automated application that are invoked by the batch server 914 (or control system/other component) in order to provide quality output data to an operator and/or automated system. It is noted that the functional components illustrated in the system 900 are exemplary in nature and not intended to define the only locations for quality phase processing in accordance with the present invention. For example, the batch server 914 may include computers or client machines and may not be present in the system 900 whereby the control system 934 performs the duties of the batch server 914. Similarly, the recipe/materials database 920 and quality execution component 944 may be associated with or incorporated within the batch server 914. In another example, the recipe/materials database 920 may exist as a network node on the Internet and thus, interacts with the control system 934 with or without assistance from the batch server 914. As can be appreciated, other functional combinations are possible with the components illustrated in the system 900.

Similar to the systems described above, the control system 934 can include various systems for processing the recipe 924. Such systems include one or more controllers 960, one or more I/O modules 964 (e.g., analog modules, digital modules, discrete AC and DC modules, Intelligent modules and so forth), communications modules 970 and equipment 974 to produce the recipe 924. The communications modules 970 facilitate control system communications across a network 980 such as ControlNet, Device, Net, Ethernet, Internet, other factory/public networks and so forth. The equipment 974 includes substantially any component for processing recipes such as machines, computers, vessels, mixers, loaders, agitators, valves, conduits, plumbing, and so forth.

Figure 10:
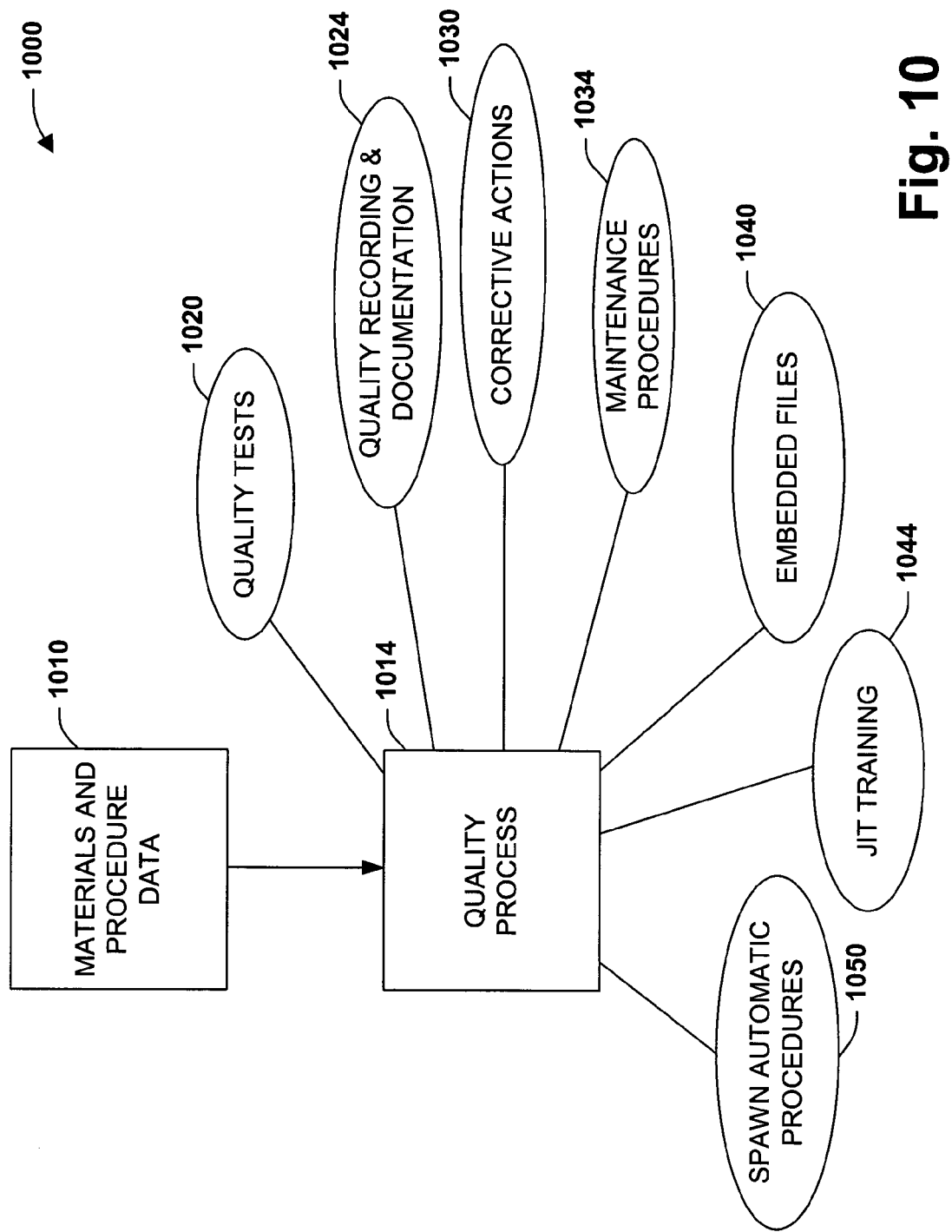
FIG. 10 is a diagram illustrating various quality phase processes in accordance with an aspect of the present invention.

FIG. 10 is a diagram illustrating various quality phase processes in accordance with an aspect of the present invention. Automated quality phase processing is provided to facilitate quality controls in an industrial controller environment. In this aspect, materials and/or procedure data 1010 is detected in accordance with a recipe wherein one or more quality processes 1014 have been associated with one or more components of a recipe and/or process associated with the recipe such as a Sequential Function Chart logic program. Before or during execution of the recipe, the quality processes 1014 or procedures are automatically initiated from various stages of the recipe in order to facilitate quality control in the overall process of recipe production.

In one aspect, the quality processes 1014 can include automatically initiating quality tests 1020 from different stages in a recipe. For example, during recipe execution, a quality test could be embedded within a recipe to cause an operator to perform the quality test 1020 (e.g., perform product testing, document activities). When the quality test has been completed, the operator can indicate to the system that the test has run and the recipe can continue through production or until another quality procedure is invoked. In another aspect, quality recording and documentation procedures 1024 can be invoked during recipe execution. This can include providing automated input screens for the operator to input data, commanding the operating to record quality data, and can include automatically recording data during recipe production.

In yet another aspect, the quality processes 1014 can include automatically performing corrective actions 1030 during recipe production. For example, if a process control parameter is detected out of range, this may include automatically invoking compensation data or altering the remainder of a recipe in order to compensate for the detected problem. Other actions can include automatically guiding the operator to perform corrective actions 1030 (e.g., providing video or other training sequence such as instruction data to instruct operator on possible courses of action). Another quality process 1014 can include performing maintenance procedures 1030 during recipe execution. For example, maintenance procedures can include automated instructions to guide the operator during various stages of a recipe. This can also include performing automated procedures such as occasionally performing background operations or stopping recipe production for short periods and then executing automated maintenance procedures on materials, components, and/or systems.

In another aspect, one or more embedded files 1040 may be provided within a recipe that can be utilized by other components or reviewed by an operator. Such files can include substantially any type of data that facilitates quality controls in accordance with the present invention. The embedded files 1040 can be of input type for receiving quality data during recipe production and/or can be of output type to transmit quality data to an operator and/or system. The quality processes 1014 can also include providing Just-In-Time training 1044 to an operator during various stages of a recipe. Such training can include any type of data format such as audio, video, text, computer simulations and so forth. In one example, if a new recipe were entered into production, a training video could be embedded at a stage in the recipe that caused the operator to perform a procedure that is different from past activities. In another example, the operator may indicate inexperience with a particular recipe and thus, a recipe with additional training information can be retrieved or executed to supplement previous training.

As noted above, the quality processes 1014 can include spawning other automatic procedures 1050 during various stages of recipe production (e.g., spawn automated recording of quality data, spawn quality control meeting, spawn an alert). By associating quality procedures to a recipe or stages thereof, timely, tighter and more stringent controls can be applied to various automation processes and thus increase overall quality in an automated manufacturing environment.

Figure 11:
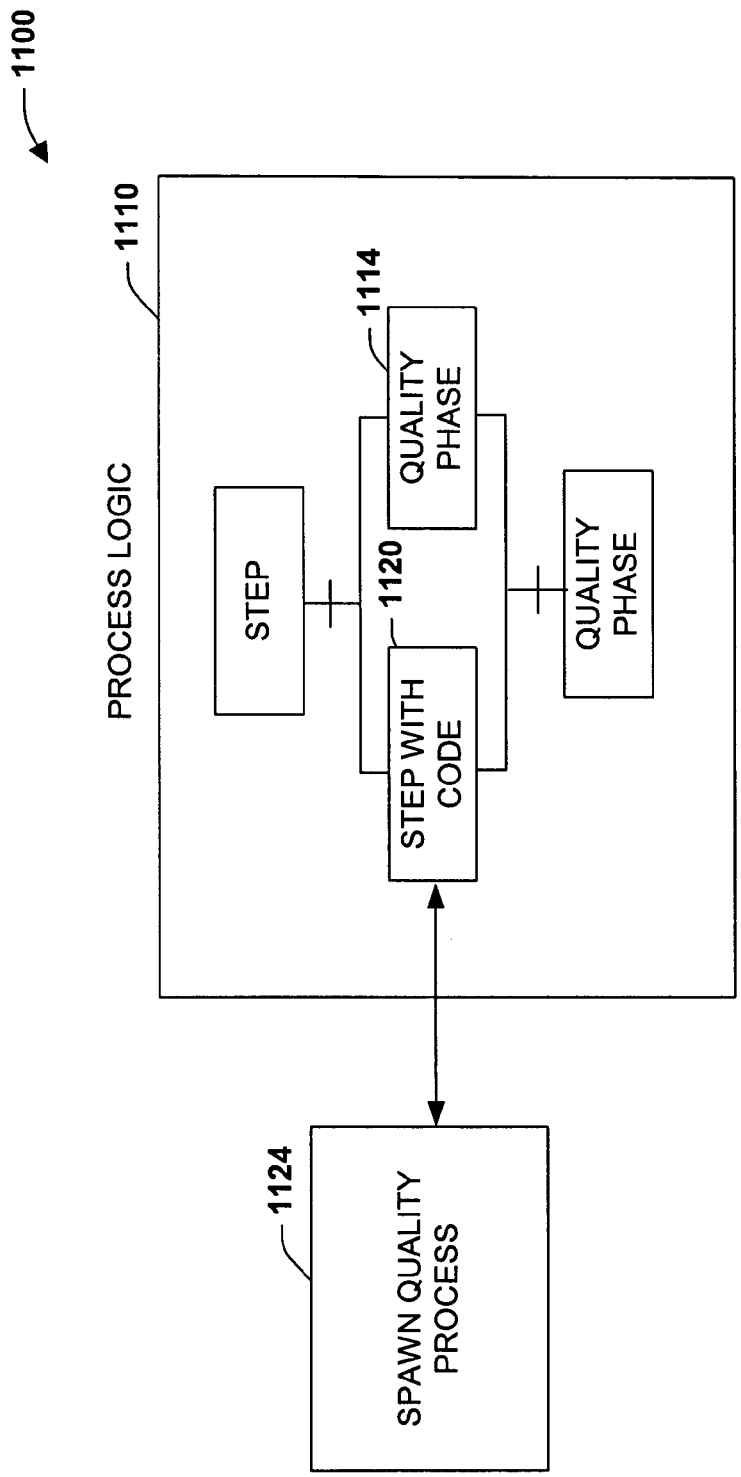
FIG. 11 is a diagram illustrating quality phase execution in accordance with an aspect of the present invention.

FIG. 11 is a system 1100 for quality phase execution in accordance with an aspect of the present invention. In this aspect, at run time of a logic program such as a Sequential Function Chart (SFC) 1110, a quality phase process may be encountered before or during execution of the SFC 1110, wherein during a step or other sequence within the SFC a reference is made to a quality process or data. In one example, the SFC 1110 may be analyzed prior to loading or execution on a controller (not shown), wherein a batch server or other component associates quality components or codes with the SFC 1110. The quality processes can be embedded within the SFC 1110 such as illustrated at 1114. In another example, a code or tag can be associated with an SFC step such as illustrated at 1120. If this type of step is encountered, a peripheral quality process can be spawned at 1124 (e.g., quality code initiates remote training to be directed from a web service that can be accessed by an operator).

Figure 12:
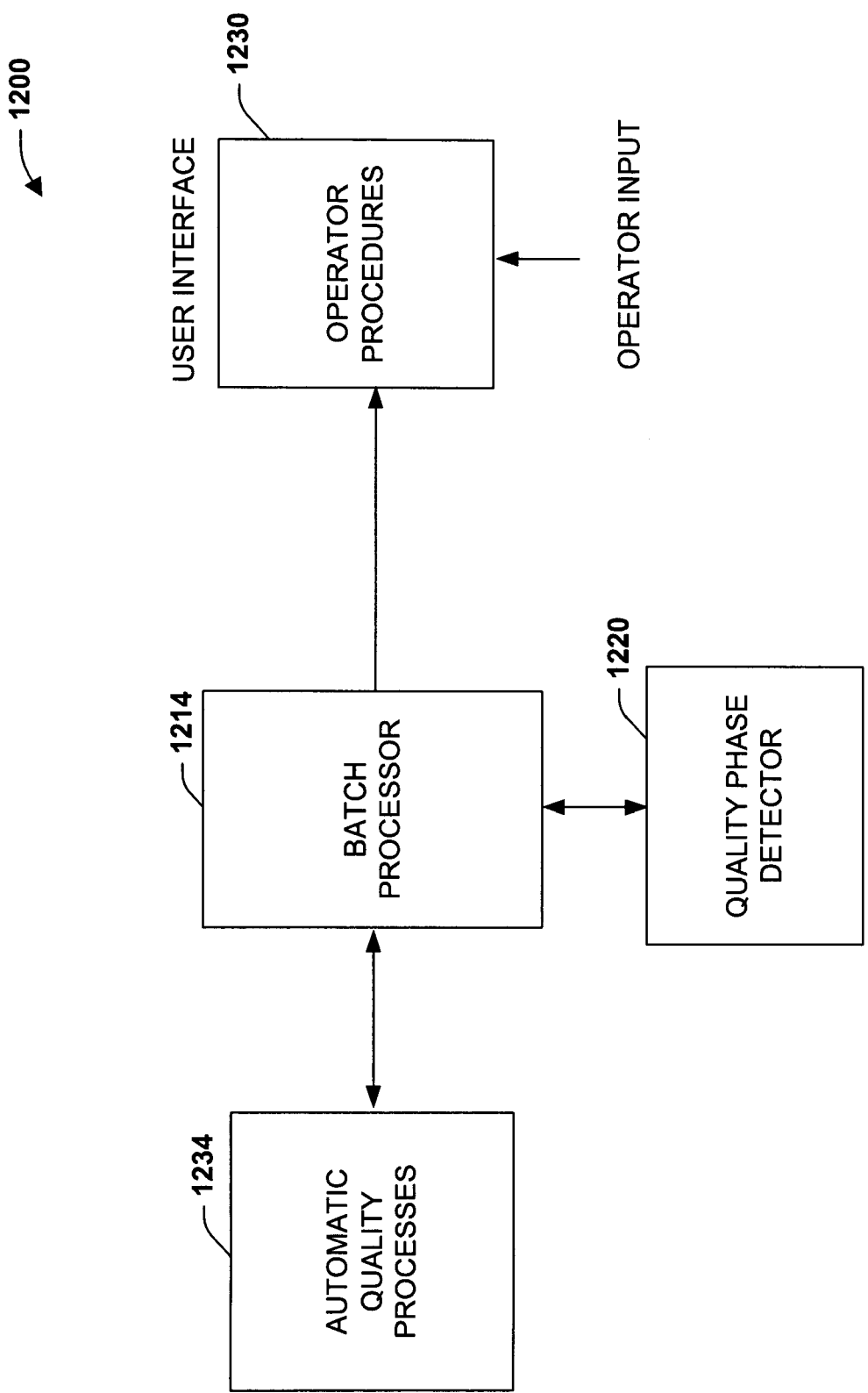
FIG. 12 is a diagram illustrating automatic quality phase detection and operations in accordance with an aspect of the present invention.

FIG. 12 is a system 1200 illustrating automatic quality phase detection and operations in accordance with an aspect of the present invention. A batch processor 1214 (or controller/component) processes a recipe (not shown), wherein the recipe is processed to determine if quality phase processes are to be executed. This can include a quality phase detector 1220 that inspects a recipe or program for codes or steps that indicate quality processing should thereby commence. In one aspect, the batch processor 1214 invokes manual quality procedures and/or exchanges data with an operator via a user interface 1230. As can be appreciated, the user interface 1230 can be provided with similar input and output capabilities as previously described above with respect to FIG. 6. In addition to manually directed quality procedures, the batch processor 1214 can also invoke automated quality procedures at 1234 (e.g., automatically begin a data recording procedure during final recipe phase).

FIG. 13 is a flow diagram of a quality phase process 1300 in accordance with an aspect of the present invention. Proceeding to 1308, one or more quality procedures and data are defined. As noted above, this can include automatically initiating quality tests from different stages in a recipe, initiating quality recording and documentation procedures during recipe execution, automatically performing corrective actions and performing maintenance procedures during recipe execution, invoking embedded files within a recipe that can be utilized by other components or reviewed by an operator, providing Just-In-Time training to an operator during various stages of a recipe, and/or spawning other automatic procedures during various stages of recipe production.

At 1312, the quality processes and data is associated with a recipe. This can include tagging portions of a control program to initiate the procedures and/or embedding procedures, instruction codes, or other data within a control program or recipe. At 1316, quality phases are detected within a program or recipe. At 1320, the detected quality phases are automatically executed. As noted above, the quality procedures can include interactions with an operator and/or include running automated applications that participate in a quality control procedure or operation.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An automation system for batch processing, comprising:
   at least one material class that describes one or more components of a recipe, the recipe manufactured by an industrial control system having associated automation components; and
   a processor to execute the recipe, wherein the at least one material class is resolved to determine the actual materials employed to manufacture the recipe.

2. The system of claim 1, the processor is a batch server that interacts with a recipe database in order to retrieve and produce a recipe.

3. The system of claim 1, the recipe includes process logic that is transmitted to an automated control system that processes and manufacturers the recipe.

4. The system of claim 1, the material class describes materials or components of the recipe.

5. The system of claim 4, the recipe includes state instructions, tags, objects, scheduling information, and quality information.

6. The system of claim 1, the material class provides a programming structure, wherein components of the class can be grouped under a common description or tag associated with the class.

7. The system of claim 1, the processor interacts with a batch resolver to determine which components of the material class are to be employed for a production cycle.

8. The system of claim 7, the batch resolver performs material class resolution in accordance with at least one of before and during runtime of a control system.

9. The system of claim 8, the batch resolver invokes at least one of a user interface and an automated component to determine components of the material class.

10. The system of claim 1, the automation components include at least one of a controller, an I/O module, an intelligent module, a communications module, a network and equipment to produce the recipe.

11. The system of claim 10, the network includes at least one of Control and Information Protocol (CIP), DeviceNet, ControlNet, Ethernet TCP/IP, DH/DH+, Remote I/O, Fieldbus, Modbus, Profibus, wireless protocols, and serial protocols, an Internet, and an Intranet.

12. The system of claim 1, the material class is applied at a phase level of a procedural model, the procedural model including at least one of a unit procedure, an operation, and a phase.

13. The system of claim 1, the material class includes at least one of a material, a component, a subclass, a nested class, and a hybrid class.

14. The system of claim 1, further comprising at least one of an equipment class and a process class.

15. The system of claim 1, the material class is resolved before or during execution of a Sequential Function Chart.

16. The system of claim 1, further comprising an automatic selection component to analyze the material class and automatically return material selections to the processor.

17. The system of claim 16, the material class is analyzed on a remote system as part of an automated management system.

18. A method for processing class structures in an industrial control system, comprising:
   defining components of a recipe within the framework of a class structure;
   associating the class structure with a recipe; and
   resolving the components of the recipe from the class structure during at least one of before and during processing of the recipe.

19. The method of claim 18, further comprising at least one of defining subclasses, nested classes and hybrid classes to describe components of the recipe.

20. The method of claim 18, further comprising automatically detecting the class structures to be resolved in accordance with a logic program.

21. The method of claim 20, further comprising providing at least one of manual procedures and automated procedures to resolve the material class structures.

22. The method of claim 18, further comprising automatically manufacturing the recipe alter resolving the components of the recipe.

23. An automation system for recipe processing, comprising:
   means for associating components of an industrial control recipe to a class;
   means for resolving the components of the class; and
   means for manufacturing the recipe.

24. A computer readable medium having stored thereon a data structure for a factory automation system, comprising:
   a first data field to describe a class structure related to a recipe, the recipe employable in an automated industrial control process;
   a second data field to describe one or more components of the class structure; and
   a third data field to link the class structure of the recipe to the automated industrial control process.

25. The data structure of claim 24, the class structure includes at least one of a material class, an equipment class, a process class, a subclass, a nested class, and a hybrid class.

* * * * *